E. M. VAN HOESEN & N. H. BROWN.

Car Coupling.

No. 9,525. Reissued Jan. 4, 1881

WITNESSES:

R. M. Deemer

James F. Tobin.

INVENTORS:

Eugene M. Van Hoesen and Nelson H. Brown.

by their Attorneys

Howson and Son.

UNITED STATES PATENT OFFICE.

EUGENE M. VAN HOESEN AND NELSON H. BROWN, OF SYRACUSE, N. Y.

CAR-COUPLING.

SPECIFICATION forming part of Reissued Letters Patent No. 9,525, dated January 4, 1881.

Original No. 119,431, dated September 26, 1871; Reissue No. 7,922, dated October 23, 1877; Reissue No. 8,412, dated September 10, 1878. Application for reissue filed November 2, 1880.

*To all whom it may concern:*

Be it known that we, EUGENE M. VAN HOESEN and NELSON H. BROWN, of Syracuse, Onondaga county, New York, have invented certain Improvements in Car-Couplings, of which the following is a specification.

The object of our invention is to provide a car-coupling, which, while obviating difficulties heretofore experienced in connecting and disconnecting cars, will make their spontaneous disconnection, under any ordinary conditions, all but impossible.

The construction and operation of our improvement are too fully described hereinafter to need preliminary explanation.

Figure 1:
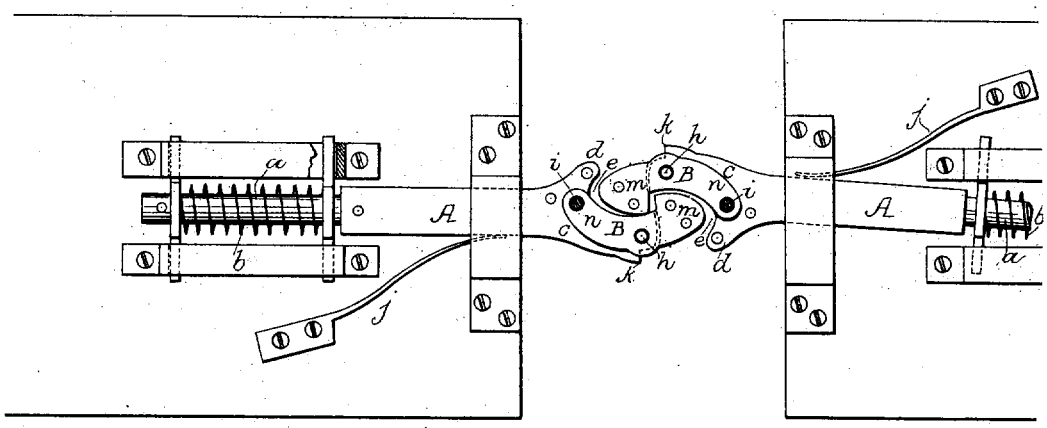
Figure 2:
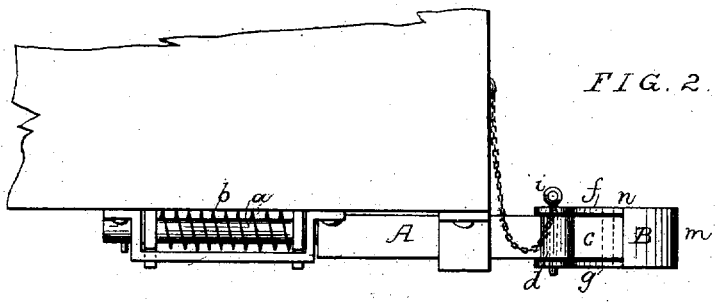
Figure 4:
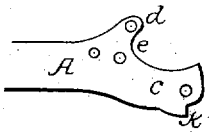
Figure 3:
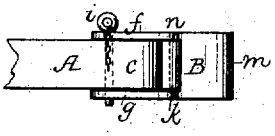
Figure 5:
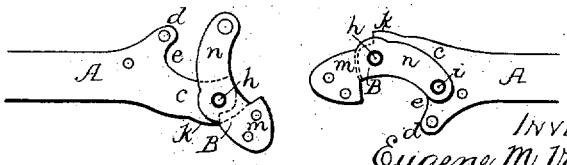

In the accompanying drawings, Figure 1 is an inverted plan view of our improved twin coupling as applied to and connecting two cars; Fig. 2, an inner-side view; Fig. 3, an outer-side view; Fig. 4, a detached view of the draw-head; and Fig. 5, a view illustrating the operation of the coupling in disconnecting and in one of the modes of connecting.

A A are two draw-heads, each of which has, at its outer end, two fingers, *c d*, between which is a cavity or chamber, *e*, Fig. 4. To the outer end of the longer finger *c* of each draw-head is pivoted, by a pin, *h*, a lever, B, which may be locked to its draw-head by a pin, *i*, passing through the top and bottom plates, *f g*, of the arm *n* of the lever, and through the draw-head. (See Fig. 2.) When thus locked the lever B forms, with the finger *c* of the draw-head, a hook at the outer end of said draw-head, of which hook the part *m* of the lever B is the nose. When unlocked from its draw-head by withdrawing the pin *i* the lever B is free to vibrate, the extent of its motion in swinging open being limited by a projection or stop, *k*, upon the draw-head finger *c*.

The operation of coupling may be performed with both levers B locked to the draw-head, the device being rendered self-coupling in this case by providing each draw-head, which is free to move laterally to a limited extent, with a spring, *j*, Fig. 1, these springs tending to force the two draw-heads toward each other.

When two cars meet, each having the lever B locked to its draw-head, and so forming a hook at the outer end thereof, the nose *m* of one hook will strike that of the other, and both draw-heads yielding laterally, the noses of the two hooks will slide against each other until they are interlocked, as shown in Fig. 1, by the pressure of the spring *j* upon the draw-heads.

Cars provided with our coupling may be coupled by bringing them together while one or both of the levers B are unlocked; and it will be evident that this capacity of the device makes the operation of coupling in many situations, as upon curves, more practicable and easy than it would otherwise be.

When two cars meet, having one or both of the levers B unlocked, the part *m* of one lever will be brought into contact with the arm *n* of the other, and the unlocked lever or levers will thus, by the coming together of the cars, be swung around until the two levers are in the interlocked position, (shown in Fig. 1,) in which position they may be secured by inserting pin *i*.

To uncouple the cars, all that is necessary is to unlock one of the levers, B, from its draw-head by withdrawing pin *i*, so that said lever is free to vibrate, then, of course, the act of separating the cars will cause the unlocked lever to be swung around, so as to become disengaged from the other. Thus the simple unlocking of one or both of the levers B makes the disconnecting of the cars, when desired, practicable and easy in situations where such disconnection has heretofore, with couplings of other constructions, been difficult or impossible.

It will be seen that the outline formed by the fingers *c* and *d* and cavity *e* of each draw-head corresponds in shape, or nearly so, with that of the nose *m* of the hook formed by the locking lever B of the adjoining draw-head, so that the fingers *c d* and cavity *e* constitute a chamber, in which the nose *m* can be received and fit snugly. It will be seen that whenever and so long as the inner side of the finger *d* of one draw-head shall bear against the rear of the hook of the other draw-head said finger must act as a stop to resist lateral displacement and disengagement, which might otherwise ensue from lateral motion of the cars occurring under those conditions.

We have provided the shank *a* of the draw-head with a spring, *b*, in such manner as to be yielding both to pressure and tension—that is to say, to constitute a yielding buffer as well as draw-head.

The draw-head between the projections *c* and *d* may be mortised to admit an ordinary coupling-link, which can be locked by the pins *i*, so that a car having the ordinary link-coupling can be connected to a car having our improved coupling.

We claim as our invention—

1. A twin coupling each part of which has a draw-head, with a lever pivoted thereto and capable of being locked thereon, said lever when so locked constituting a hook at the outer end of its draw-head, and being when unlocked free to vibrate upon said draw-head, all substantially as herein described.

2. A twin coupling each part of which has a draw-head, with a lever pivoted thereto and capable of being locked to or unlocked from the same, said lever having an arm, *n*, adapted when the lever is free to vibrate upon its draw-head to be acted upon by the part *m* of the lever of an adjacent draw-head, for the purpose of effecting a coupling, substantially as described.

3. A twin coupling each part of which has a draw-head with a lever pivoted thereto, and capable of being locked to or unlocked from the same, said lever having an arm, *n*, serving as a locking arm, and adapted when the lever is unlocked to be acted on by the part *m* of the lever of an adjacent draw-head for the purpose of effecting a coupling, all substantially as described.

4. In a twin coupling, the combination of a draw-head, A, and pivoted lever B with a device for locking the arm *n* of said lever to the draw-head.

5. A twin coupling each part of which has a draw-head constructed with fingers *c d* and a cavity, *e*, in combination with a lever, B, pivoted so as to swing freely upon said finger *c*, but capable of being locked thereto, all substantially as described.

6. In combination with a lever, B, pivoted to and adapted to swing freely on a draw-head, a stop, *h*, upon the outer side of the said draw-head, for the purpose set forth.

In testimony whereof we have signed our names to this specification in the presence of two subscribing witnesses.

EUGENE M. VAN HOESEN.
NELSON H. BROWN.

Witnesses:
WM. F. LYON,
B. C. NOTTINGHAM.